United States Patent [19]
Douglis et al.

[11] Patent Number: 6,021,426
[45] Date of Patent: Feb. 1, 2000

[54] METHOD AND APPARATUS FOR DYNAMIC DATA TRANSFER ON A WEB PAGE

[75] Inventors: Frederick Douglis, Somerset; Antonio Haro, Paterson; Michael Rabinovich, Gillette, all of N.J.

[73] Assignee: AT&T Corp, New York, N.Y.

[21] Appl. No.: 08/982,308

[22] Filed: Dec. 1, 1997

Related U.S. Application Data

[60] Provisional application No. 60/054,366, Jul. 31, 1997.

[51] Int. Cl.[7] .............................. G06F 13/00; G06F 15/00
[52] U.S. Cl. ..................... 709/200; 709/203; 709/218; 709/217; 709/219; 705/26; 705/27; 705/30; 395/187; 395/186; 707/104; 707/501
[58] Field of Search ................................. 709/203, 218, 709/217, 219, 200; 395/187, 186; 705/26, 27, 30; 707/104, 501

[56] References Cited

U.S. PATENT DOCUMENTS

| | | | |
|---|---|---|---|
| 5,572,643 | 11/1996 | Judson | 395/155 |
| 5,715,453 | 2/1998 | Stewart | 707/104 |
| 5,732,219 | 3/1998 | Blumer et al. | 395/200.57 |
| 5,793,966 | 8/1998 | Amstein et al. | 395/200.33 |
| 5,852,717 | 12/1998 | Bhide et al. | 395/200.33 |
| 5,892,905 | 4/1999 | Brandt et al. | 395/187.01 |
| 5,897,622 | 4/1999 | Blinn et al. | 705/26 |

OTHER PUBLICATIONS

ACM/IEEE Present MOBICOM '96—Mobile Computing and Networking (title page, pp. 108–116).
Mark West, *Service Side Includes*, 14 pgs.
Gaurav Banga, Fred Douglis, Michael Robinovich, *Optimistic Deltas for WWW Latency Reduction*, 15 pgs.
Netscape 2, Special Edition, Brown, Mark R., AcQue Corporation, Jan. 19, 1995, pp. 610–646, 642, 645, 647–674, 836–838, 787–810.

*Primary Examiner*—Frank J. Asta
*Assistant Examiner*—Beatriz Prieto

[57] ABSTRACT

A system and method for transferring information resources over a network from one source to another that reduces latency and bandwidth requirements on the network. The information resources are made up of at least a static and dynamic portion. A client requests information, and a server receives the request and then transmits to the requestor the desired information. The server may send both the static and dynamic portion of the information resource, or the server may sent only the dynamic portion of the resource, depending on the client's needs and the request made. By discriminating between the static and dynamic portions of an information resource in this way, less data must be sent from the server to the client on every access. Also, the computational load that is typical of servers on a network is shifted to the client, thereby reducing latency.

13 Claims, 3 Drawing Sheets

METHOD AND APPARATUS FOR DYNAMIC DATA TRANSFER ON A WEB PAGE

CROSS REFERENCES TO RELATED APPLICATIONS

This application claims the benefit of U.S. Provisional Application No. 60/054,366, filed Jul. 31, 1997.

BACKGROUND OF THE INVENTION

FIELD OF THE INVENTION

The present invention relates to information over a network, and in particular, ways of transferring resources over a network to reduce latency and bandwidth requirements for the network.

There are several standard methods of data transfer that are used to decrease latency and bandwidth requirements on a network. Three examples are caching, compression, and delta encoding. Caching is a way of temporarily storing a resource, and plays a crucial role in a wide-area distributed system such as the World Wide Web. For example, requested web pages can be quickly retrieved from a web page cache rather than the original server, saving time and network traffic. It significantly reduces response time for accessing cached resources by eliminating long-haul transmission delays. Furthermore, caching reduces backbone traffic and the load on content providers. However, caching is of limited value when much of the data on a network is dynamic, such that information is likely to change after the data was last cached. Under these circumstances, the cached information is no longer reliable. Therefore, when a significant portion of network resources are dynamic, they are not cacheable because the resource is freshly generated upon every access. In addition, the content provider might explicitly prohibit caching.

Compression is a way of reducing data size to save space or transmission time by eliminating redundancy. For data transmission, compression can be performed on just the data content or on the entire transmission (data content plus header data). However, the amount a file can be compressed is limited by the redundancy in the file content, typically by 50% for text.

Delta encoding is a way of transmitting encodings of the changes between subsequent versions of a resource. This avoids having to resend the entire resource each time it is changed. Instead, only the changes are sent. This reduces bandwidth requirements and improves end-to-end performance. In order to use delta encoding, a complete version of a resource is cached in a first computer, the one sending the request, but for the first computer to view that cached resource, the cached resource must be compared with another complete version of that resource cached or stored in a second computer, the computer responding to the request. The difference between the two complete resources is then computed, and the older cached resource is updated and then displayed. With delta-encoding, one might cache a resource even if it is considered uncacheable, but not present the cached data without first obtaining the changes to its current version. One advantage of this method is that it applies uniformly to all uncacheable resources regardless of the reason why the resources are uncacheable. Another advantage is that delta encoding can be implemented transparently, via proxies, so that content providers need not be modified. However, the delta-encoding proposals have disadvantages as well. Delta-encoding requires both computers to have a common version base used by the sending computer to compute the delta and by the receiving computer as the basis against which to apply the delta. If the content provider must compute the delta-encodings on the fly, it suffers overhead and must store a potentially large number of past versions; if the delta computation is performed by an intermediary, then the entirety of each version of the resource must be sent from the content provider to the intermediary, and the encoding must still be performed on the "critical path."

With a common class of resources, such as those provided by search engines, a significant part of the resource is essentially static. Portions of the resource vary to different extents from one query response to another (the difference between two pages in response to a single query is usually smaller than the difference between pages from different queries). Also, the location of the dynamic portions relative to the rest of the resource does not change. These resources traditionally have been dealt with in a calculation-intensive and memory wasteful environment.

For example, a technique called Server-Side Includes (SSI) allows one to specify a placeholder on a page where a dynamic content can be inserted. However, this technique is performed on the server in a calculation-intensive way. Another example is Microsoft's Active Server Pages (ASP). This technique includes instructions to pre-process a page. However, this pre-processing again is performed by the server, so bandwidth or server load are not reduced. The present invention seeks to overcome these shortcomings.

SUMMARY OF THE INVENTION

The present invention introduces a way of reducing a network's latency and bandwidth requirements in a way different from previously-known methods. The benefits of this invention are achieved by caching static portions of the dynamic resource on the client and by shifting much of the computational burden from the server to the client.

The invention involves a regime which allows the explicit separation of static and dynamic portions of a resource. In other words, the resource is explicitly separated into a template and per-query bindings; the client can pre-process them in order to arrive at a current instantiation of the resource. The static portion may contain macro-instructions for inserting dynamic information. The static portion which includes these instructions (the template) can be cached freely. The dynamic portion contains the bindings of macro-variables to strings specific to the given access. The bindings are obtained for every access, and the template is expanded by the client prior to rendering the document. In this way, and unlike delta encoding, only one version of the resource is necessary in order to reconstruct a complete and updated resource. Also, the server must generate the dynamic data only for each access, not the entire resource.

The present invention is advantageously designed to minimize the size of the bindings. Experiments have shown a remarkable difference in size between the original resource and the bindings. According to our latest data, the uncompressed bindings are 4–8 times smaller than the uncompressed original resource, while compressed bindings are 2–4 times smaller than the compressed original resource. Thus, sending just the bindings results in the corresponding traffic reductions compared to sending entire resources.

Although the terms "client" and "server" have well-understood meanings in the context of the Internet, for purposes of this invention, this description uses the terms in a broader sense: the term "client" means an entity that requests information, and the term "server" means an entity which receives a request for information.

In one embodiment of the present invention, the client requests from the server the entire resource, and the server responds by sending only the dynamic portion of the document, which is reconstructed by the client. If the client does not have the static portion, a request is sent to the server, and the server responds by supplying the static portion of the resource, which can be cached for subsequent access.

In another embodiment, the client will first determine whether it needs the static portion of the document. If it does, it first requests both the static and dynamic portion of the resource. If the client determines it does not need the static portion, it simply requests the dynamic portion.

DETAILED DESCRIPTION

Figure 1A:
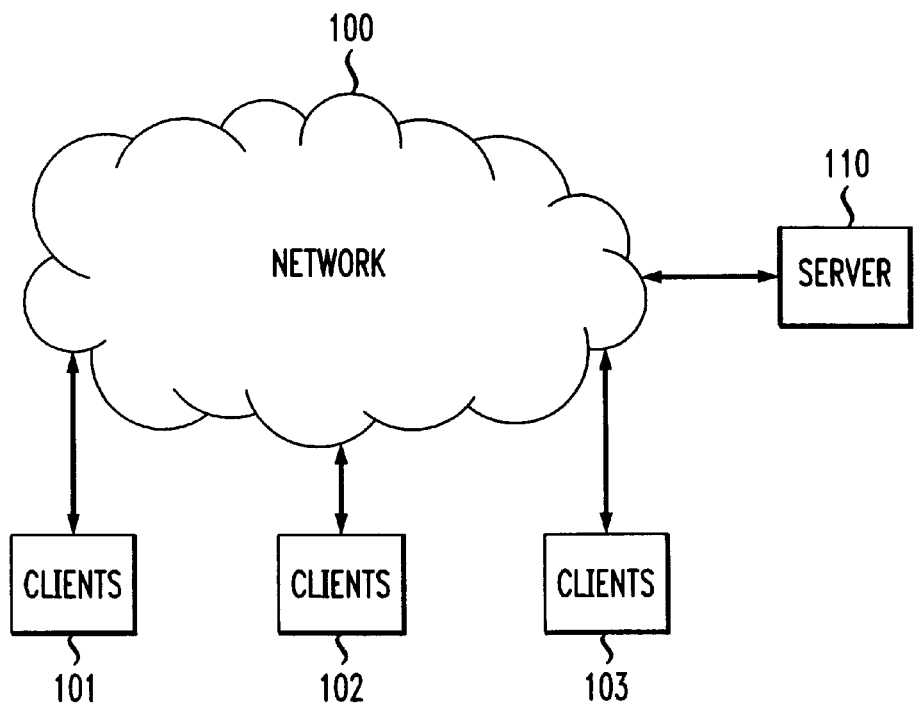
FIG. 1a illustrates a system-level block diagram of an embodiment of the present invention.

The present invention is directed to ways of transferring resources over a network to reduce latency and bandwidth requirements for the network. Referring now in detail to the drawings, there is illustrated in FIG. 1a a system-level embodiment of the present invention. Clients, in this figure denoted by 101, 102, and 103, request through network 100, at least a portion of a resource from the server 110. The resource presumably is made up of at least a static portion and a dynamic portion. The server then supplies either the entire resource, just the dynamic, or just the static portion of the resource, depending on the client's needs. Since the static portion can be cached by the clients, only the dynamic portion is usually supplied for popular resources, thereby reducing the network traffic and the load of the content server.

Typical examples of requests for resources are Uniform Resource Locators (URLs). In an embodiment of the present invention, the resource requested is a document written in Hypertext Markup Language (HTML) containing both static and dynamic portions, although the spirit and scope of the invention is not limited to HTML. The static portion, or template, contains tags which delineate where in the HTML code the components of the dynamic portion are to be inserted. Tables 1 and 2 show an example of how to delineate the static and dynamic portions of the data.

Consider the following resource:

```
<HTML>
<HEAD>
<TITLE>Michael Rabinovich</TITLE>
<BODY>
...
The time is 1:15pm.
This page has been accessed 10 times.
</BODY>
</HTML>
```

In Table 1, the left-hand column contains the template, or static portion, of this resource. The right-hand column contains the dynamic portion of the resource at issue corresponding to a particular instantiation. In Table 1, the static portion of the data contains the tag "VAR" and variables "time" and "count." The "VAR" tags delineate where in the HTML the dynamic data corresponding to the variable "time" and "count" are to be inserted. In the example in Table 1, the "VAR" tag is used to define a single dynamic variable and is used in the template as a placeholder for a variable to be replaced by a text segment dynamically bound to this variable. The tag "DYNAMICS" is used to define the dynamic portion of the resource. This dynamic portion, which always corresponds to a particular instantiation of the resource, is stored in a way that can be accessed by the server and sent to the client. The client then has the burden of combining the static and dynamic portions of the resource by inserting the instant values, in this case "time=1:15 pm" and "count=10," into their proper places in the static portion of the resource so that the entire resource may be viewed by the client.

TABLE 1

| Template for a simple query. | The dynamic portion corresponding to a particular instantiation. |
|---|---|
| <HEAD><br><TITLE>Michael Rabinovich</TITLE><br><BODY><br><br>The time is <VAR time>.<br>This page has been accessed<br><VAR count> times.<br></BODY> | <HTML><br><TEMPLATE HREF="query.hpp"><br><br><DYNAMICS><br>time = 1:15pm;<br>count = 10;<br></DYNAMICS><br></HTML> |

In another embodiment of the invention, a tag in the template allows the template, possibly in combination with one or multiple dynamic-variable tags like "VAR," to loop through a calculation. A pre-processor would expand the template fragment within the loop as many times as the number of bindings to the macro-variable specified in the loop fragment of the dynamic part of the resource. This is illustrated in Table 2. Furthermore, the loop may contain multiple dynamic variable tags. When the loop has multiple dynamic variables, each iteration consumes the next dynamic binding for each dynamic variable. When the dynamic data list is exhausted for one of the variables, the loop stops.

Consider the following resource, which is the original resource for Table 2:

```
<FONT SIZE=+1>1</FONT>

<A HREF="/cgi-bin/search-engine?first=11&query=caching+dynamic+objects">2</A>

<A HREF="/cgi-bin/search-engine?first=21&query=caching+dynamic+objects">3</A>
<...>
```

The left-hand column of Table 2 contains an example of a template of this resource in the context of a hypothetical search engine called "search-engine." The template contains the dynamic-variable tag "LOOP" with the dynamic-variable tag "VAR" nested within the loop. After increasing the font size and outputting "1," the static portion of the resource shown in the left-hand column of Table 2 begins a loop. Every operation within the tags <LOOP> and </LOOP> is performed a variable number of times set by the dynamic portion of the resource, shown in the right-hand column of Table 2.

TABLE 2

| A Template Demonstrating a Loop in the Context of a Search-Engine Query | The Dynamic Part of the Resource Using the LOOP |
|---|---|
| <FONT SIZE=+1>1<FONT> <LOOP> .  <A HREF="/cgi-bin/ search-engine?first= <VAR 10*(subcount- 1)+1>&query=<VAR query>"> <VAR subcount></A> </LOOP> | <HTML> <TEMPLATE HREF=" query.hpp"> <DYNAMICS> query = caching+dynamic+ objects <LOOP> subcount = 2 to 10, 1; </LOOP> </DYNAMICS> </HTML> |

In another embodiment of the present invention, conditional statements, e.g. "IF," are used within the loop variable. In another embodiment of the present invention, tags are introduced to set or define an initial or subsequent value of a dynamic or iterative variable.

Along these lines, an embodiment of the present invention is implemented as an extension to HTML. The HTML extension contains the following new tags: VAR, LOOP, IF, SET-VAR and DYNAMICS. The VAR and LOOP tags are used in the template as instructions regarding the location of dynamic content. In other words, they are used as macro-expressions in the HTML text to mark the place in the static portion of the resource where dynamic data may be inserted. The DYNAMICS tag is used to define the dynamic part of the document. It contains bindings of the macro-variables to dynamic text strings specific to the current document access. The IF tag is a conditional statement, and the SET-VAR tag is used to define an initial or subsequent value of a dynamic variable in the context of iterative calculations. The LOOP tag is a way of performing iterative calculations with dynamic variables. As can be seen with these tags, and unlike delta encoding, only one version of the resource is necessary to create the entire resource. A client that has the ability to use the present invention may relay that information to the server via the HTTP header. Of course, the names of the tags are arbitrary and are chosen in this case simply for their descriptive value; the tags may take any name as long as they function in the desired way.

Figure 1B:
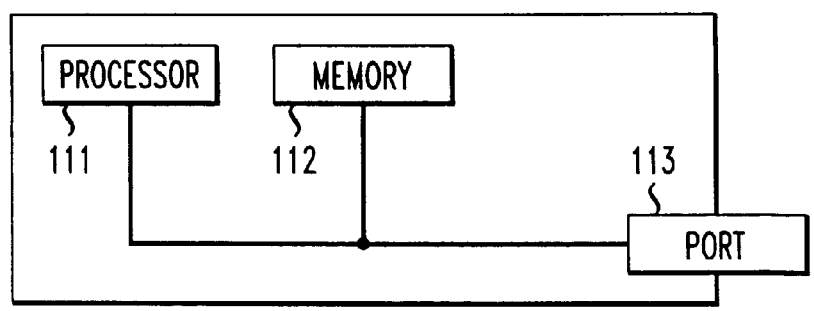
FIG. 1b illustrates an embodiment of an apparatus and system in accordance with the present invention.

FIG. 1b shows an embodiment of an apparatus in accordance with the present invention. The apparatus in this embodiment corresponds to server 110 in FIG. 1a, and includes a processor 111, a memory 112 that stores instructions adapted to be executed in the processor 111 to receive requests for resources and to send resources, and a port 113 adapted to be connected to the network, with both the port and memory coupled to the processor. In this embodiment, a server 110, connected to a network through a port, would store in memory instructions necessary to respond to requests for resources. After a request for at least a portion of a resource enters the apparatus from the network via the port, the processor responds to the request by sending back through the network either the dynamic portion of the data or both the static and dynamic portions of the data. In one embodiment, there is a memory for storing at least a portion of the resource.

Figure 2:
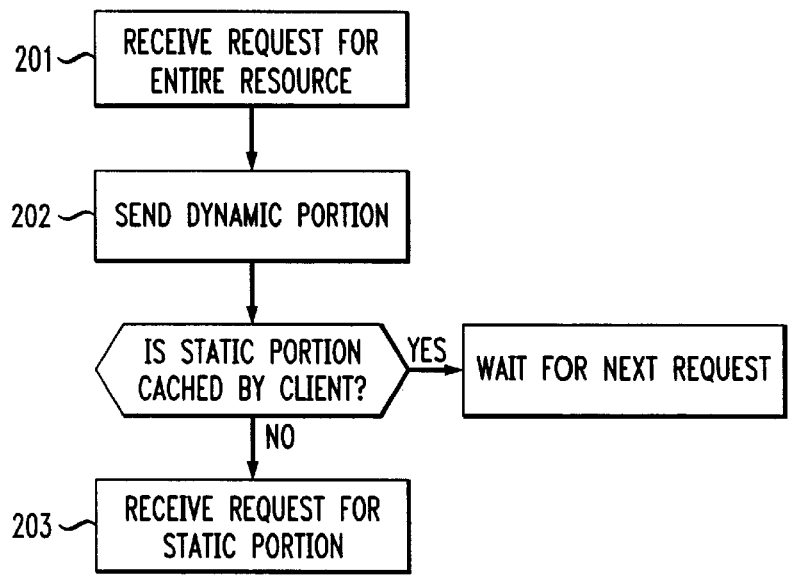
FIG. 2 illustrates a flow chart of an embodiment of a method in accordance with the present invention.

FIG. 2 shows an embodiment of a method in accordance with the present invention, shown from the server's perspective. At step 201, a server receives a request for an entire resource, having at least one static portion and one dynamic portion. At step 202, in response to this request, the server sends only the dynamic portion of the resource. This dynamic portion contains data allowing the client to find and obtain the static counterpart. At step 203, if the server then receives a request for at least the static portion, the server sends the static portion in response to the request.

Figure 3:
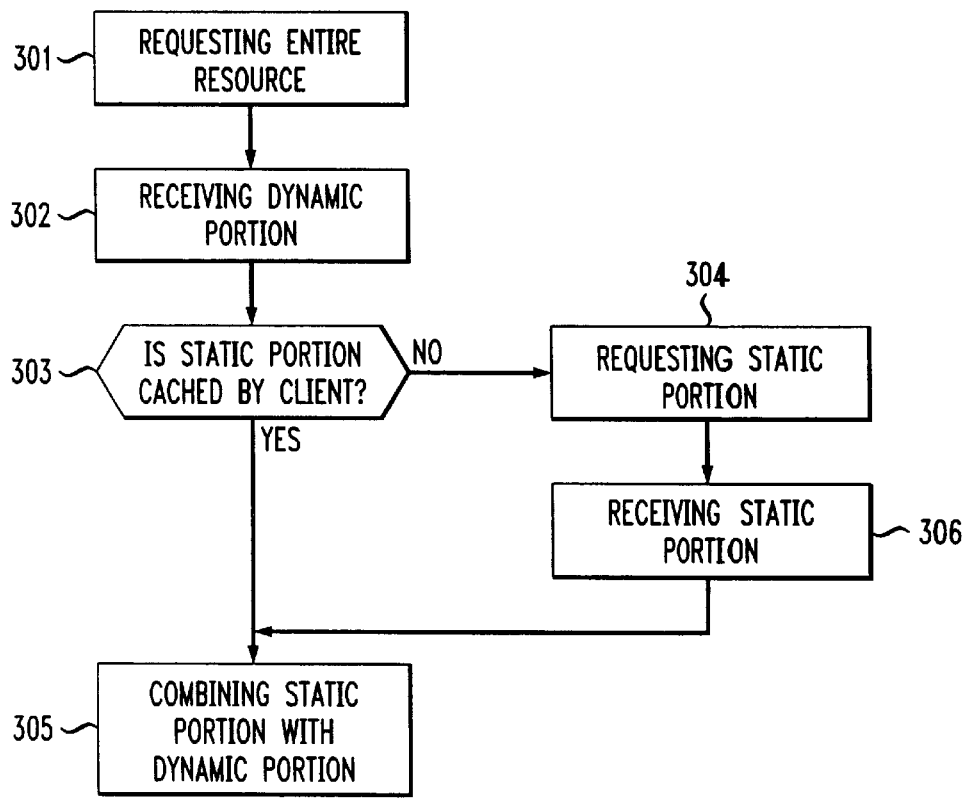
FIG. 3 illustrates a flow chart of another embodiment of a method in accordance with the present invention.

FIG. 3 shows an embodiment of a method in accordance with the present invention from the client's perspective of the transaction. At step 301, the client requests an entire resource, having at least one static and one dynamic portion. At step 302, the client then receives, in response to this request, only the dynamic portion of the resource. This dynamic portion contains data allowing it to find and connect to its static counterpart. At step 303, if the client determines that it needs the static portion, e.g., the static portion is not cached at the client, the client then moves to step 304, requesting from the server the static portion of the resource to match up to the dynamic portion of the resource, and step 306, where the client receives the static portion. After use of the data resource, the static portion is cached to await future use. At step 305, after the client has both the static and dynamic portions, the next step is to combine the dynamic and static portions.

Figure 4:
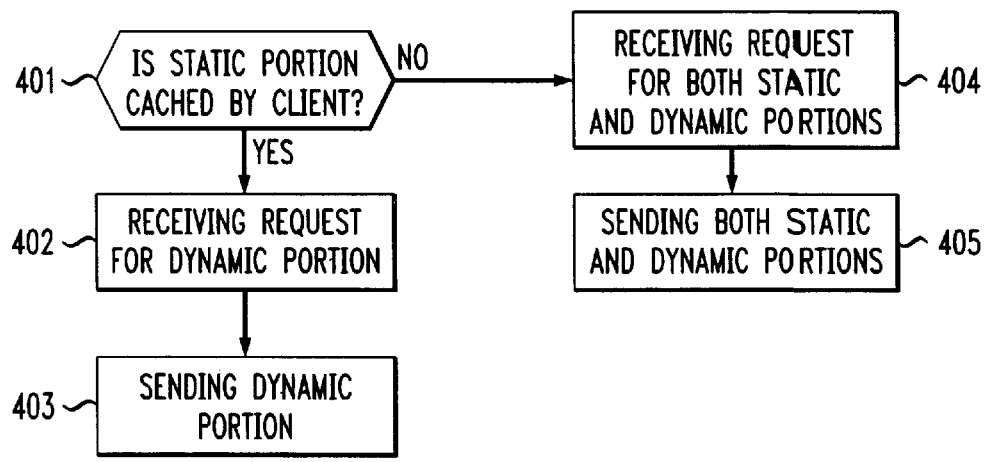
FIG. 4 illustrates a flow chart of another embodiment of a method in accordance with the present invention.

In another embodiment of a method in accordance with the present invention, shown in FIG. 4 from the server's perspective, the party desiring the resource (the client) at step 401 determines, as an initial matter, whether it needs the static portion of the resource. This differs from the previously-described embodiment in that, in the previously-described embodiment, the client requests the entire resource and the server responds with simply the dynamic portion. However, in the embodiment shown in FIG. 4, the client makes an initial determination of its needs. At step 402, if the client does not need the static portion, the server receives a request for at least the dynamic portion of the resource, and in response, at step 403, sends the dynamic portion of the resource. If the party does need the static portion, at step 404, the server receives a request for at least the static and dynamic portions and at step 405 sends both static and dynamic portions. This embodiment is advantageous because it reduces the total number of requests made to a given server, thereby reducing total transmission time.

Figure 5:
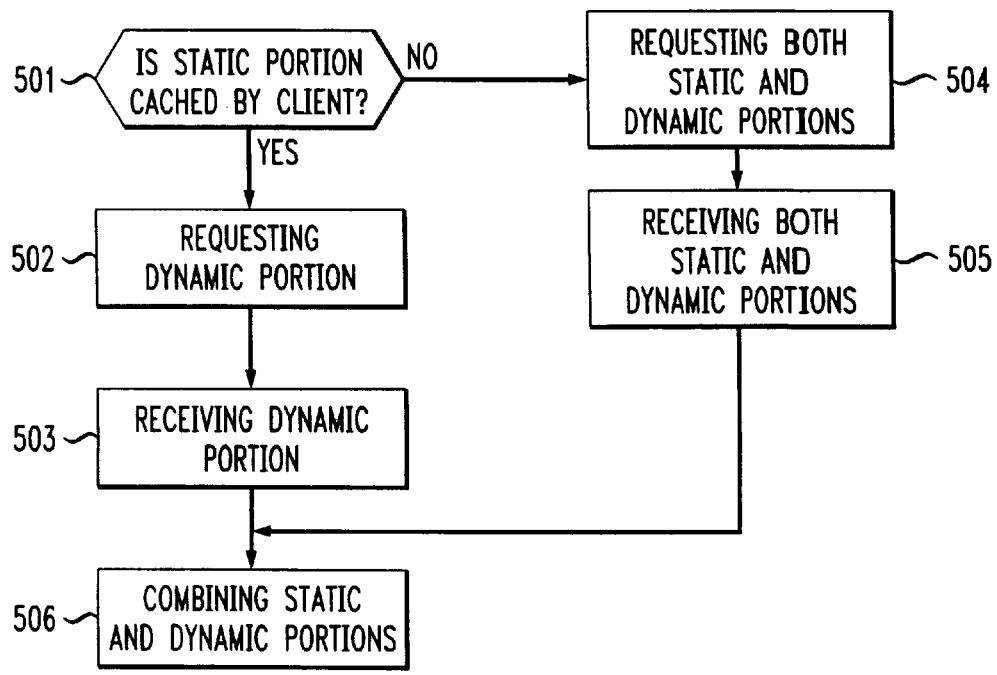
FIG. 5 illustrates a flow chart of another embodiment of a method in accordance with the present invention.

FIG. 5 shows an embodiment of the present invention from the client's perspective of the transaction. From the client's perspective, the party desiring the resource (the client) determines up front at step 501 whether it needs the static portion of the resource. If the client does not need the static portion, then at step 502, the client sends a request for at least the dynamic portion of the resource, and in response, at step 503, receives the dynamic portion of the resource. If the client does need the static portion, at step 504 the client requests at least the static and dynamic portions and at step 405 receives both static and dynamic portions. Finally, at step, 506, the client combines the static and dynamic portions.

As explained in detail above, the invention allows for data transfer with reduced bandwith and latency requirements in a network. The major benefit is found in a server that is configured to receive requests for dynamic data, or portions thereof, and respond as detailed above. With this invention, the server's computational burden is reduced by eliminating the necessity of generating the entire resource, comparing it to an earlier version of the same resource and computing the difference. Furthermore, unlike the prior art, only one version of the resource is necessary to create a new instantiation.

Although various embodiments are specifically illustrated and described herein, it will be appreciated that modifications and variations of the present invention are covered by the above teachings and within the purview of the appended claims without departing from the spirit and intended scope of the invention. For example, while embodiments of the invention are useful with dynamic documents written in HTML, it can be appreciated that any number of other languages, such as SGML, can be used with the present invention.

What is claimed is:

1. A method for transferring over a network at least a portion of a resource having at least a template and a dynamic portion, comprising the steps of:
   a. receiving a request from a client for at least the dynamic portion of the resource;
   b. sending the dynamic portion of the resource, the dynamic portion adapted to be combined with the template; and
   c. if said client lacks the template, then performing the sub-steps of:
      i. receiving a request for said template, and
      ii. sending said template.

2. The method of claim 1 wherein said resource is a HTML document.

3. The method of claim 1 wherein an HTML extension relating to said resource contains at least one dynamic-variable tag.

4. The method of claim 1 wherein an HTML extension relating to said resource contains a loop tag.

5. The method of claim 1 wherein an HTML extension relating to said resource contains a tag used to define the dynamic part of the document.

6. A computer readable medium that stores instructions adapted to be executed by a processor to perform the steps of:
   a. receiving a request from a client for at least a dynamic portion of a resource, the resource including at least a template and a dynamic portion;
   b. sending the dynamic portion of said resource, the dynamic portion adapted to be combined with the template; and
   c. if the client lacks the template, then performing the sub-steps of:
      i. receiving a request for the template, and
      ii. sending the template.

7. A method for transferring over a network at least a portion of a resource having at least a template and a dynamic portion, comprising the steps of:
   a. receiving a request from a client for at least a dynamic portion of the resource;
   b. sending the dynamic portion of the resource in response to the request for at least a dynamic portion of the resource, the dynamic portion adapted to be combined with the template; and
   c. after sending a dynamic portion of the resource,
      i. receiving a request for the template; and
      ii. sending the template in response to the request for the template.

8. The method of claim 7 wherein said resource is a HTML document.

9. The method of claim 7 wherein an HTML extension relating to said resource contains at least one dynamic-variable tag.

10. The method of claim 7 wherein an HTML extension relating to said resource contains a loop tag.

11. The method of claim 7 wherein an HTML extension relating to said resource contains a tag used to define the dynamic part of the document.

12. A method for transferring over a network at least a portion of a resource having at least a template and a dynamic portion, the method comprising:
   (a) receiving a request from a client for at least a dynamic portion of the resource;
   (b) sending, in response to the request, only the dynamic portion of the resource, the dynamic portion being adapted to be combined with the template; and
   (c) if the client lacks the template, then performing the sub-steps of:
      (i) receiving a request for the template, and
      (ii) sending the template.

13. A method for transferring over a network at least a portion of a resource having at least a template and a dynamic portion, the method comprising:
   (a) receiving a request from a client for at least the dynamic portion of the resource;
   (b) sending, in response to the request, the dynamic portion of the resource without sending the template, the dynamic portion being adapted to be combined with the template; and
   (c) if the client lacks the template, then performing the sub-steps of:
      (i) receiving a request for the template, and
      (ii) sending the template.

* * * * *